No. 870,005. PATENTED NOV. 5, 1907.
J. W. WIRTZ & E. J. HERNLEN.
HAY PRESS.
APPLICATION FILED MAR. 22, 1907.
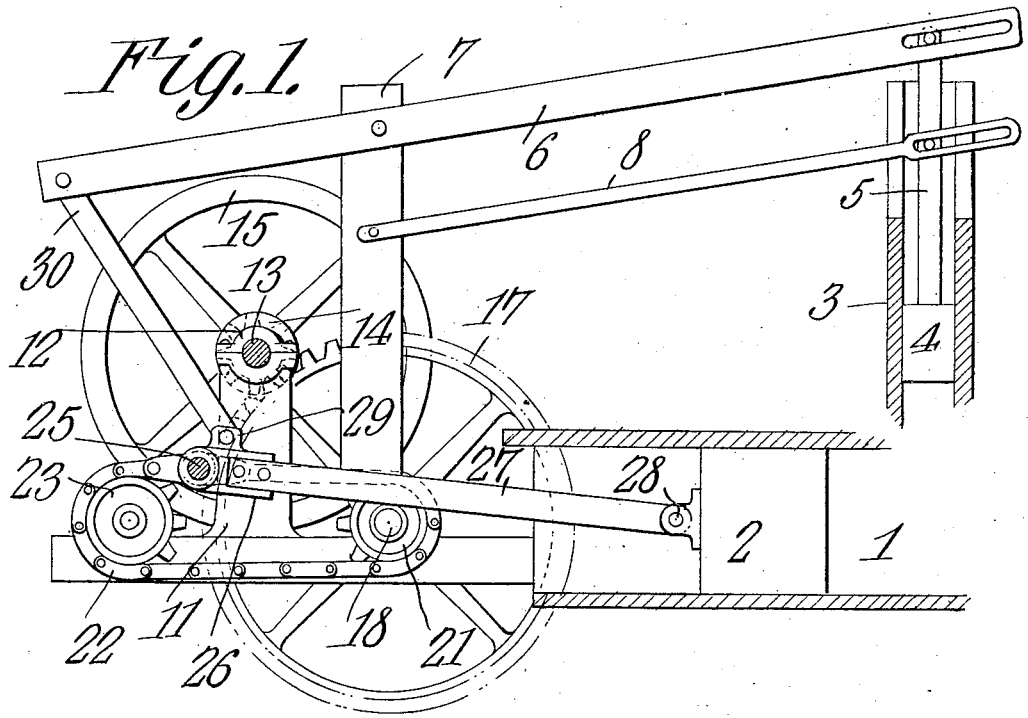
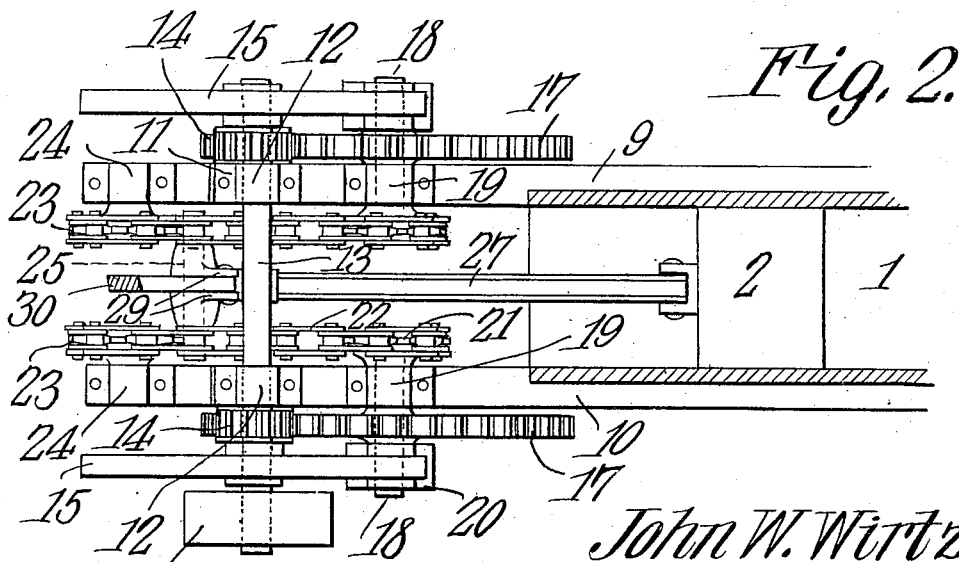

UNITED STATES PATENT OFFICE.

JOHN W. WIRTZ AND EMILE J. HERNLEN, OF AUGUSTA, GEORGIA.

HAY-PRESS.

No. 870,005.　　　Specification of Letters Patent.　　　Patented Nov. 5, 1907.

Application filed March 22, 1907. Serial No. 363,881.

*To all whom it may concern:*

Be it known that we, JOHN W. WIRTZ and EMILE J. HERNLEN, citizens of the United States, residing at Augusta, in the county of Richmond and State of Georgia, have invented a new and useful Hay-Press, of which the following is a specification.

This invention has reference to improvements in hay presses designed more particularly for operation by power transmitted by a belt from a prime mover.

The invention is operated on the principle of an endless belt or chain movement; that is, the follower of the press is moved rapidly forward in a direction to compress the hay until a point is reached where great pressure is needed through a limited range of movement to cause the final compacting of the hay into a bale before the bands are applied. This final movement is with the present invention confined to a space of a few inches but the time element and the power are at this time so related that great pressure may be applied for the final compacting of the hay but with a movement much less than that usually employed with lever presses.

In the practical embodiment of our invention we employ endless sprocket chains passing around sprocket pinions, and mount upon these chains a wrist pin connected to one end of the follower-pitman of the press. The sprocket pinions nearest to the press are mounted directly upon the power shaft, driven by suitable intermediate gearing from a belt pulley receiving power from any suitable source, or, if desired, the intermediate gearing may be directly driven by the prime mover. The sprocket chains are driven continuously in one direction with the result that the follower is forced into the pressure chamber to the full extent of its travel and then withdrawn therefrom for the introduction of a fresh charge of hay, all as a continuous operation, but the arrangement is such that the sprocket pinions nearest to the pressure chamber engage directly with the wrist pin or parts connected therewith, or it may be with parts carried directly by the pitmen, so that the final pressure is borne by the sprocket pinions instead of by the chains, and this latter part of the mechanism is therefore relieved from strain and is much less liable to be broken or injured than it would be were it to stand the high pressure necessary for the final compression of the hay into the compacted form desired.

The invention will be fully understood from the following detailed description taken in connection with the accompanying drawings forming part of this specification, in which,—

Figure 1 is a central longitudinal section of so much of a hay press as is necessary for the understanding of the present invention; and Fig. 2 is a plan view, partly in section and with some of the parts shown in Fig. 1 omitted.

Referring to the drawings, there is indicated a pressure chamber 1 within which is arranged a presser head or follower 2, both of which may be of ordinary construction and require no special description. Arranged in operative relation to the pressure chamber 1 is a feeder 3 having a follower 4, and in the drawings the feeder 3 is simply indicated and not shown in detail since in itself it forms no part of the present invention and may be of any suitable construction. The follower 4 is carried by a pitman 5 connected to one end of a walking beam 6 mounted upon an upright 7 constituting a part of the frame of the machine, and a bar 8 connected at one end to the upright 7 and at the other end to the pitman 5 completes this portion of the feeder-actuating parts, all of which may be of well-known construction. The framework of the machine comprises among other parts two parallel beams 9—10 between which may be arranged a pressure chamber 1. These beams carry near one end two standards 11 carrying journal bearings 12 at their upper ends, and in these journal bearings is mounted a shaft 13 constituting the power shaft of the machine, and this power shaft extends across the space between the beams 9 and 10 and to each side of the journal bearings 12.
Immediately adjacent to and outside of the journal bearings 12 the power shaft 13 carries gear pinions 14 and beyond these pinions 14 the power shaft carries fly-wheels 15, while one end of the shaft is continued beyond one of the fly-wheels and there has secured to it a belt pulley 16 designed to receive power through a suitable belt, not shown, coming from some prime mover, also not shown; but power may be directly applied to the power shaft, if desired, as, for instance, by an electric motor, but if other types of motor are used it is usually necessary to apply the power by means of a belt.

Each gear pinion 14 is in mesh with a gear wheel 17, one on each side of this part of the machine, and these gear wheels 17 are each mounted and fast upon a short countershaft 18 having journal bearings 19 on the respective beams 9 or 10 and other journal bearings 20 outside of the same on the other side of the gear wheels 17. The journal bearings 20 are appropriately mounted upon a fixed portion of the frame of the machine, but such portion of the framework is not shown in the drawings. Each shaft 18 projects for a short distance into the space between the side beams 9 and 10 and there carries a sprocket pinion 21. Around each sprocket there is passed an endless sprocket chain 22, which latter also passes around and is supported by idler sprocket pinions 23 having journal bearings 24 at or near the ends of the beams 9 and 10 respectively remote from the pressure chamber 1. The sprocket chains may be of the ordinary type consisting of overlapping side links with bar pivots and one of these bar pivots is constituted by a wrist pin 25 extending not only through the links but entirely across the space between the two beams, and this wrist pin carries the pitman head 26 to which the outer end of the pitman 27 is connected, the other end of the pitman being journaled, as indicated at 28, to the follower head 2. The pitman head 26 is provided with a pair of ears 29 to which is pivotally connected a link 30 pivotally joined at the other end to the end of the walking beam 6 remote from its connection with the pitman 5 of the feeder follower 4.

Now, let it be assumed that the parts are in the position shown in Figs. 1 and 2, that a charge of hay has been introduced into the pressure chamber 1, and that the power shaft is being rotated in a direction to force the follower 2 into the pressure chamber. During the movement of that portion of the chains 22 carrying the wrist pin 25 in the direction toward the pressure chamber the hay is being compacted to a greater and greater extent until finally the teeth of the sprocket pinions 21 will engage the portions of the wrist pin 25 in their path and the chains will then be relieved from the pressure caused by the resistance of the hay to the forward movement of the follower 2. By the time this point is reached the back-pressure of the hay is largely increased and the final compacting is performed entirely by the pinions 21 engaging the wrist pin 25. Thus the chains are entirely relieved from the strain due to the high pressure being brought to bear upon the hay. During the forward movement of the pitman 27 the follower 4 has been withdrawn by the action of the link 30 and walking beam 6 from the feeder chamber 3, and after the wrist pin 25 has passed around the sprocket pinions 21 and is returning in a direction to pull the follower 2 out of the pressure chamber 1, the connections to the follower 4 cause the latter to be moved in a direction to feed the hay into the pressure chamber 1, so that by the time the wrist pin has passed upward around the idler sprocket pinions 23 and the follower 2 is again forced in a direction to compact the hay, a fresh charge of hay has been introduced into the pressure chamber 1 and the machine is ready to again compress the hay into the compacted form desired.

We claim:—

1. In a press, a pressure chamber, a follower therefor, a pitman connected to the follower, two parallel, endless, spaced sprocket chains, sprocket pinions supporting the chains in planes parallel with the plane of movement of the follower, power transmitting mechanism connected to the sprocket pinions, and a wrist pin connected to the end of the pitman remote from the follower and constituting at each end one of the pivot connections of adjacent links of the respective sprocket chain.

2. In a press, a pressure chamber, a follower therefor, a pitman connected to the follower, two parallel, endless, spaced sprocket chains, sprocket pinions supporting the chains in planes parallel with the plane of movement of the follower, power transmission mechanism connected to the sprocket pinions, a wrist pin connected to the end of the pitman remote from the follower and constituting at each end the pivot connection of two adjacent links of the respective sprocket chain, a feeder mechanism, and a link connection therefrom to the wrist pin.

In testimony that we claim the foregoing as our own, we have hereto affixed our signatures in the presence of two witnesses.

JOHN W. WIRTZ.
EMILE J. HERNLEN.

Witnesses:
PAUL GONLEY,
D. STEPHENS.